Oct. 25, 1955     J. W. MURPHY     2,721,781
SCRIBER FOR RELATIVE MOVEMENT RECORD
Filed Nov. 16, 1953

INVENTOR:
Joseph W. Murphy
By Herbert E. Metcalf
His Patent Attorney

United States Patent Office 2,721,781
Patented Oct. 25, 1955

2,721,781

SCRIBER FOR RELATIVE MOVEMENT RECORD

Joseph W. Murphy, Encino, Calif., assignor to Northrop Aircraft, Inc., Hawthorne, Calif., a corporation of California Application November 16, 1953, Serial No. 392,285

2 Claims. (Cl. 346—49)

My invention relates to a novel means of measuring direction and magnitude of movement of two or more closely adjacent elements having relative motion with respect to one another.

A problem has arisen recently in the field of guided missiles the solution of which may have wide application in a great many other fields where there is movement of two bodies located closely adjacent one another and the direction and magnitude of movement of one with respect to the other is desired. Due to the fact that some missiles may crash shortly after they are launched, certain information is necessary in order to ascertain the reason for the launching failure. Thus, the angle at which the missile was actually launched is a necessary fact. Furthermore, it may be pertinent to know whether there was any significant lateral movement or yawing of the missile at such time. Another salient point is whether any vertical displacement of the rearward missile section occurred prior to any definite forward motion. With the advent of my invention the aforementioned information is readily and accurately obtainable through the medium of a simple and relatively inexpensive device.

It is therefore a general object of my invention to provide a novel means for measuring direction and magnitude of movement of two or more closely adjacent elements having relative motion with respect to one another.

A more specific object of my invention is to provide a means for measuring forward angular motion and vertical displacement from a reference point of two closely adjacent bodies having relative motion with respect to one another.

Another object of my invention is to provide a means for measuring any substantial lateral motion or yawing of two closely adjacent bodies having relative motion.

Other objects and uses will become apparent to those skilled in the art in view of the subsequent disclosure and drawings wherein.

Figure 1:
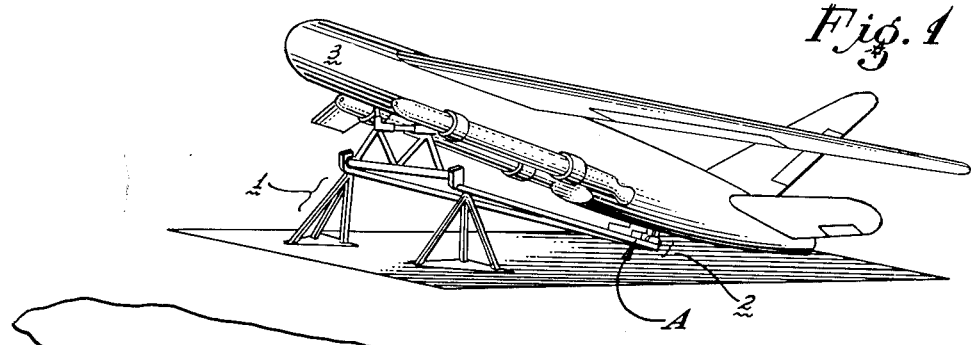
Figure 1 is a perspective view of an aircraft having my invention attached thereto as indicated by the arrow A.
Figure 2:
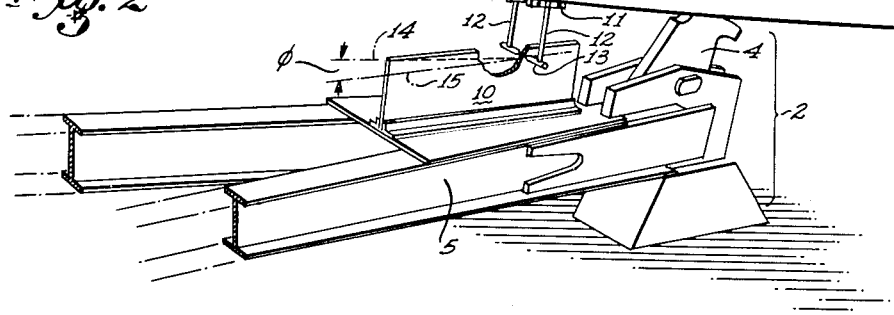
Figure 2 is an enlarged perspective view of the section pointed to in Figure 1 by the arrow A.
Figure 3:
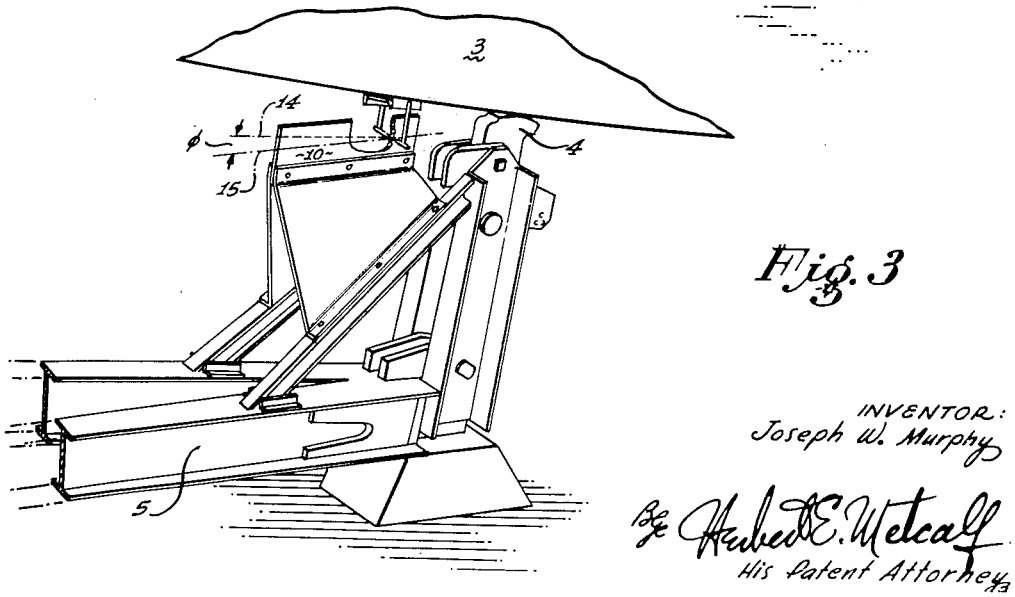
Figure 3 is a fragmentary perspective view of an alternate embodiment of my invention.

Referring to the drawings, front launching positioning means 1 and a rear launching positioning means 2 are used to support the particular body 3 to be propelled skyward. A pivotal member 4 secured to the rear positioning means 2 is seated within a mating recess (not shown) in the rearward section of the body 3. Releasably secured to a frame member 5 linking the front and rear positioning means 1 and 2 is a scribe plate 10. An alternative mode of attaching the plate 10 is shown in Figure 3. Connected to the rearward section of the body 3 is a bracket 11 to which resilient scribing members 12 are firmly attached. The scribing members 12 are formed with inwardly projecting scribing means 13 at one end thereof, which means 13 are effective to scribe a line along either side of the plate 10.

Thus, when the body 3 is launched, the scribing means 13 will scribe a line 14 on either side of the plate 10 which will indicate visually the path of the body 3 during its initial travel. The launching angle $\phi$ is readily attainable by comparing the scribed line 14 with a convenient horizontal reference line 15. In the event that the rearward section of the body 3 moves substantially upward prior to any definite forward movement, this too will be recorded on the scribe plate 10 by a vertical line of a magnitude equal to the vertical movement. Similarly, where the body 3 moves correctly only for a few inches and then plummets to the ground, the scribed line 14 on the plate 10 will so indicate. Should there be substantial lateral movement, i. e. yawing, of the body 3 from its intended path, then, in such event, the scribing plate 10 will be scribed on but one side rather than both sides. This is so because one of the scribing members 12 has been precluded from contact with the plate 10 by virtue of the lateral displacement of the body 3.

Hence it is seen that with the information registered on the plate 10 after the body 3 is launched, any ensuing launching failures may be readily deduced and corrected in the future. Elucidating somewhat, if the rear pivotal member 4 is not functioning properly, the plate 10 will probably show some vertical displacement and so on, in accordance with the cause of the failure.

While in order to comply with the statute, the invention has been discribed in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A recording means for indicating the vertical angular direction of movement and the lateral displacement from a predetermined course of the upper of two closely adjacent superposed bodies during the initial travel of one of said bodies, the lower of said bodies remaining stationary, said indicating means comprising: a bracket member secured to the underneath surface of said upper body; a vertical scribe plate secured to the top surface of said stationary body; and two resilient scribing members one positioned on each side of said plate and each of which is secured to said bracket member at one end of said scribing members, the other end of said scribing members being formed with inwardly scribing means projecting toward one another and each effective to scribe a line on one vertical surface of said scribing plate when there is relative motion between said bodies without lateral displacement therebetween, and effective to scribe a line on but one vertical surface of said scribing plate when said relative motion is accompanied by a lateral displacement from said predetermined course.

2. Recording means for indicating deviation of a movable body from an initial path of movement away from a stationary structure on which it is initially supported, comprising: means supporting said movable body in initial position spaced from the fixed structure; an elongated straight scribe plate mounted on said fixed structure and extending toward said movable body normal to the adjacent surface thereof; a first scribing member mounted on and projecting from said movable body and engaging against one face of said scribe plate; a second scribing member mounted on and projecting from said movable body and engaging against the opposite face of said scribe plate both said scribing members being arranged so that yawing of the movable member will carry the scribing member on the side toward which the lateral movement occurs out of engagement with the plate but the opposite scribing member will remain in operative engagement with the plate; and a line on each side of said plate representing the correct path of movement of the movable body, the deviation of the marks made by the scribing members from said lines indicating the actual path of movement of the movable body and the interruption of one line indicating yawing of the movable body toward the side on which said interruption occurs.

References Cited in the file of this patent

UNITED STATES PATENTS

| | | |
|---|---|---|
| 1,310,200 | Maxim | July 15, 1919 |
| 1,722,069 | Widney | July 23, 1929 |
| 1,798,983 | Parsons | Mar. 31, 1931 |